US012522670B2

(12) United States Patent
Buffe et al.

(10) Patent No.: US 12,522,670 B2
(45) Date of Patent: Jan. 13, 2026

(54) HYDROXYPROPYL-BETA-CYCLODEXTRIN AND PROCESS FOR THE PRODUCTION THEREOF

(71) Applicant: ROQUETTE FRERES, Lestrem (FR)

(72) Inventors: Clothilde Buffe, Lomme (FR); Joël Delattre, Douvrin (FR); Vincent Wiatz, Premesques (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 17/255,153

(22) PCT Filed: Jun. 28, 2019

(86) PCT No.: PCT/FR2019/051602

§ 371 (c)(1),
(2) Date: Dec. 22, 2020

(87) PCT Pub. No.: WO2020/002851

PCT Pub. Date: Jan. 2, 2020

(65) Prior Publication Data

US 2021/0253746 A1 Aug. 19, 2021

(30) Foreign Application Priority Data

Jun. 29, 2018 (FR) ..................................... 18 55952
Mar. 8, 2019 (FR) ..................................... 19 02375

(51) Int. Cl.
*C08B 37/16* (2006.01)
*A61K 47/40* (2006.01)

(52) U.S. Cl.
CPC .......... *C08B 37/0012* (2013.01); *A61K 47/40* (2013.01)

(58) Field of Classification Search
CPC .. C08B 37/0012; A61K 31/724; A61K 47/40; A61K 47/6951
See application file for complete search history.

(56) References Cited

U.S. PATENT DOCUMENTS 5,744,154 A 4/1998 Maurin et al.
5,756,484 A 5/1998 Fuertes et al.
5,831,081 A * 11/1998 Reuscher ............ C08B 37/0012 536/127
2016/0361344 A1 12/2016 Salome et al.
2018/0207198 A1 7/2018 Salome et al.

FOREIGN PATENT DOCUMENTS

| | | | |
|---|---|---|---|
| CN | 1155888 | A | 7/1997 |
| CN | 102040675 | A | 5/2011 |
| CN | 108034010 | A | 5/2018 |
| EP | 3210597 | A1 | 8/2017 |
| WO | 8502767 | A1 | 7/1985 |
| WO | WO-9012035 | A1 * | 10/1990 |
| WO | 2006037769 | A1 | 4/2006 |
| WO | 2013004462 | A1 | 1/2013 |
| WO | 2016201137 | A1 | 12/2016 |

OTHER PUBLICATIONS

Szente, L. et al "Highly soluble cyclodextrin derivatives . . . " Adv. Drug Deliv. Rev., vol. 36, iss 1, pp. 17-28. (Year: 1999).*
Machine translation of CN 108034010. (Year: 2018).*
Pitha, J. et al "Hydroxypropyl-b-cyclodextrin: preparation and characterization . . . " Int. J. Pharm., vol. 29, pp. 73-82. (Year: 1986).*
CN102040675A , 2011, machine translation. (Year: 2011).*
The English translation of the International Search Report, mailed on Dec. 13, 2019, in the corresponding PCT Appl. No. PCT/FR2019/051602.
The English translation of the Chinese Office Action, mailed on Nov. 18, 2022, in the related Chinese Patent Appl. No. 201980044053.4.

* cited by examiner

*Primary Examiner* — Layla D Berry

(57) ABSTRACT

The present invention relates to a novel hydroxypropyl-β-cyclodextrin (HPβCD) and also to a novel process that is of use for producing same. The invention also relates to the use of this HPβCD as an excipient. The invention also relates to an HPβCD for use thereof as a medicament, and more particularly for the treatment or prevention of diseases or conditions related to cholesterol overload and/or storage and/or accumulation in the tissues, and also the consequences thereof, such as certain central nervous system or cardiovascular system ailments.

10 Claims, 3 Drawing Sheets

Figure 1

Hydroxypropyl Betadex

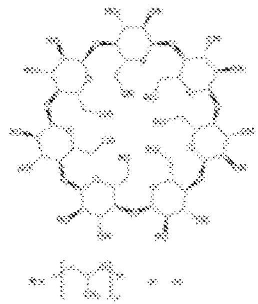

$C_{42}H_{70}O_{35}(C_3H_6O)_x$ where $x = 7 \times$ MS, MS being molar substitution Beta cyclodextrin, 2-hydroxypropyl ether [94035-02-6].

DEFINITION

Hydroxypropyl Betadex is a partially substituted poly(hydroxypropyl) ether of Betadex. The number of hydroxypropyl groups per anhydroglucose unit expressed as molar substitution (MS) is NLT 0.40 and NMT 1.50 and is within 10% of the value stated on the label.

IDENTIFICATION

- A. Infrared Absorption (197K): The spectrum obtained with Hydroxypropyl Betadex shows the same absorption bands as the spectrum acquired with USP Hydroxypropyl Betadex RS. Due to the difference in the substitution of the substance, the intensity of some absorption bands may vary.
- B. It meets the requirements of the test for *Clarity of Solution*.

ASSAY

- Molar Substitution

(See *Nuclear Magnetic Resonance Spectroscopy* (761).)

The molar substitution (MS) is calculated from the ratio between the signal from the three protons of the methyl group, contained in the hydroxypropyl functional group, and the signal from the proton attached to the carbon $C_1$ (glycosidic proton) of the anhydroglucose units.

Use a Fourier-transform nuclear magnetic resonance (NMR) spectrometer having a magnetic field strength of at least 6 Tesla and that is capable of performing quantitative analysis using proton NMR spectroscopy at a temperature of at least 25°.

Sample solution: Mix NLT the equivalent of 10.0 mg of dried Hydroxypropyl Betadex with 0.75 mL of deuterium oxide thoroughly in an NMR tube. Place the tube into an NMR probe.

Analysis: Adjust the spectrometer settings so that a high-resolution proton NMR spectrum can be acquired that will provide quantitative data. Acquire a free induction decay (FID) with at least 8 transients using a spectral window from at least 0–6.2 ppm, with the solvent peak located at 4.8 ppm at 25°. Zero fill the spectrum at least three times, and Fourier transform the FID with no Gaussian line broadening and no more than 0.2 Hz of Lorenzian line broadening.

Determine the peak areas of the doublet from the methyl protons of the hydroxypropyl functional group at 1.2 ppm ($A_1$) and the peak areas from the glycosidic protons, which are located between 5 and 5.4 ppm ($A_2$).

Calculate the MS:

$$\text{Result} = A_1/(3A_2)$$

$A_1$ = area of the methyl group of hydroxypropyl $A_2$ = area of the glycosidic proton The degree of substitution is the number of hydroxypropyl groups per molecule of betadex and is obtained by multiplying the MS by 7.

Acceptance criteria: 0.40–1.50 and within 10% of the value stated on the label

IMPURITIES

*Delete the following:*

*• Heavy Metals, *Method I* (231): NMT 20 µg/g•

- Limit of Betadex, Propylene Glycol, and Other Related Substances

Mobile phase: Water

Standard solution A: 15 mg/mL of USP Beta Cyclodextrin RS and 25 mg/mL of USP Propylene Glycol RS

Standard solution B: 1.0 mL of *Standard solution A* diluted with water to 10.0 mL

Sample solution: Dissolve 2.50 g of Hydroxypropyl Betadex, accurately weighed and calculated on the dried basis, in water with the aid of heat. Cool, and dilute with water to 25.0 mL. The resulting solution is 100 mg/mL of Hydroxypropyl Betadex, calculated on the dried basis, in water.

Chromatographic system

(See *Chromatography* (621), *System Suitability*.)

Mode: LC

Detector: Differential refractometer

Columns

Guard: Packing L11

Analytical: 3.9-mm × 30-cm; packing L11

Column temperature: 40°

Flow rate: 1.5 mL/min

Injection volume: 20 µL

System suitability

Samples: *Standard solution A* and *Standard solution B*

[Note—The retention time of propylene glycol is about 2.5 min, and the relative retention times with reference to that of propylene glycol for betadex and hydroxypropyl betadex are about 4.2 and about 6, respectively; Hydroxypropyl Betadex elutes as a very wide peak or several peaks.]

Suitability requirements

Resolution: NLT 4 between betadex and propylene glycol, *Standard solution A*

Relative standard deviation: NMT 2.0%, *Standard solution B*

Analysis

Samples: *Standard solution B* and *Sample solution*

Acceptance criteria: Disregard any peaks eluting before propylene glycol and after the hydroxypropyl betadex peak.

Betadex: NMT 1.5%; the area of the betadex peak in the *Sample solution* is NMT the area of the corresponding peak from *Standard solution B*.

Propylene glycol: NMT 2.5%; the area of the propylene glycol peak in the *Sample solution* is NMT the area of the corresponding peak from *Standard solution B*.

Any other single impurity: NMT 0.25%; the area from any other single impurity peak is NMT 0.1 times the area of propylene glycol in the chromatogram of *Standard solution B*.

Total impurities excluding betadex and propylene glycol: NMT 1%; the total area from all impurity peaks, excluding betadex and propylene glycol, is NMT 0.4 times the area of propylene glycol from *Standard solution B*.

Figure 2

Disregard limit: 0.1%; disregard any peaks that are less than 0.04 times the area of propylene glycol from *Standard solution B*.

• Limit of Propylene Oxide

Ether stock solution: Add 75 µL of ether to 30 mL of dimethylacetamide in a 50-mL volumetric flask, dilute with dimethylacetamide to volume, and mix. This solution contains 1.0 mg/mL of ether.

Internal standard solution: Add 30 µL of *Ether stock solution* to 70 mL of dimethylacetamide in a 100-mL volumetric flask, dilute with dimethylacetamide to volume, and mix.

Propylene oxide stock solution

[Caution—Propylene oxide is toxic and flammable. Prepare this solution in a well-ventilated fume hood.]

Add 30 mL of dimethylacetamide into a 50-mL volumetric flask. Weigh the flask and contents accurately, add 60 µL of propylene oxide (cooled in a refrigerator) into the flask with a 100-µL cooled microsyringe, weigh again, and calculate the weight of propylene oxide added, by difference. Dilute with dimethylacetamide to volume, and mix. This solution contains 1.0 mg/mL of propylene oxide.

[Note—Propylene oxide is a gas at room temperature. It is usually stored in a lecture-type gas cylinder or small metal pressure bomb. Chill the cylinder in a refrigerator before use. Transfer 5 mL of the liquid propylene oxide to a 100-mL beaker chilled in wet ice. Use a gas-tight syringe that has been chilled in a refrigerator.]

System suitability solution: Add 30 µL of *Ether stock solution* and 20 µL of *Propylene oxide stock solution* to 70 mL of dimethylacetamide in a 100-mL volumetric flask, dilute with dimethylacetamide to volume, and mix.

Standard stock solutions: Add 7 mL of dimethylacetamide into each of four 10-mL volumetric flasks. Transfer the following amounts of *Propylene oxide stock solution* into each of the four flasks using a microsyringe, with one amount per flask: 40, 100, 200, and 400 µL. Dilute with dimethylacetamide to volume, and mix. The *Standard stock solutions* contain about 4, 10, 20, and 40 µg/mL of propylene oxide, respectively.

Standard solutions: Into each of four 10-mL headspace vials, transfer 200 ± 5 mg of Hydroxypropyl Betadex, calculated on the dried basis. Pipet 1.0 mL of the *Internal standard solution* into each vial, and close the vial with septum and cap. Into each of the vials add 10 µL of each of the *Standard stock solutions* using a 10-µL syringe, respectively. Allow each vial to stand, and gently shake until the sample is dissolved. The *Standard solutions* contain, respectively, about 0.04, 0.1, 0.2, and 0.4 µg/mL of propylene oxide.

Sample solution: Transfer 200 ± 5 mg of Hydroxypropyl Betadex, calculated on the dried basis, into a 10-mL headspace autosampler vial. Pipet 1.0 mL of the *Internal standard solution* into the vial, and close the vial with a septum and cap. Add 10 µL of dimethylacetamide using a 10-µL syringe. Allow the vial to stand, and gently shake until the sample is dissolved.

Chromatographic system

(See *Chromatography* ⟨621⟩, *System Suitability*.)

Mode: GC with a balanced pressure automatic headspace sampler

Detector: Flame ionization

Column: 0.32-mm × 10-m fused-silica capillary; coated with a 10-µm layer of stationary phase S3

Temperatures

Injection port: 120°

Detector: 250°

Column: See *Table 1*.

Table 1

| Initial Temperature (°) | Temperature Ramp (°/min) | Final Temperature (°) | Hold Time at Final Temperature (min) |
|---|---|---|---|
| 50 | — | 50 | 10 |
| 50 | 10 | 100 | 10 |
| 100 | 20 | 220 | 4 |

Transfer line: 120°

Carrier gas: Helium

Flow rate: 2 mL/min, corresponding to the linear velocity of 44 cm/s

Injection volume: 1.0 mL

Injection type: Split injection; the split ratio is 1:1.

System suitability

Sample: *System suitability solution*

[Note—The relative retention times for propylene oxide and ether are about 1.0 and 1.3, respectively.]

Suitability requirements

Resolution: NLT 2.0 between ether and propylene oxide

Analysis

Samples: *Standard solutions* and *Sample solution*

Separately place the vials containing the *Standard solutions* and the *Sample solution* in the automated sampler, and start the sequence so that the vial is heated at a temperature of 100° for 30 min before a suitable portion of its headspace is injected into the chromatograph.

Using a 2-mL gas syringe preheated in an oven at 110°, separately inject the headspace from each vial into the chromatograph. Chromatograph the *Standard solutions* and the *Sample solution*, record the chromatograms, and measure the area ratios of the peak responses of propylene oxide and ether.

Determine, based on a retention time comparison, whether propylene oxide is detected in the *Sample solution*. Plot the area ratios of the peak responses of propylene oxide and ether of the *Sample solution* and the *Standard solutions* versus the content, in µg, of propylene oxide in each vial, as furnished by the *Standard stock solutions*, draw the straight line best fitting the five points, and calculate the correlation coefficient for the line. [Note—The *Sample solution* should be plotted as if it had a content of added propylene oxide equivalent to 0 µg.]

A suitable system is one that yields a line having a correlation coefficient of NLT 0.99. Extrapolate the line until it meets the content axis on the negative side. The distance between this point and the intersection of the axes represents the total amount, $T_S$, in µg, of propylene oxide in the *Sample solution*.

Calculate the percentage of propylene oxide in the portion of sample taken:

$$\text{Result} = (T_S/W) \times 100$$

$T_S$ = total amount of propylene oxide from the graph in the *Sample solution* (µg)

$W$ = weight of Hydroxypropyl Betadex taken to prepare the *Sample solution* (µg)

Acceptance criteria: NMT 0.0001%

SPECIFIC TESTS

• Microbial Enumeration Tests ⟨61⟩ and Tests for Specified Microorganisms ⟨62⟩: The total aerobic microbial count does not exceed $10^3$ cfu/g, and the total combined molds and yeasts count does not exceed $10^2$ cfu/g.

Figure 3

- Loss on Drying ⟨731⟩
  Sample: 1 g
  Analysis: Dry the *Sample* at 120° for 2 h.
  Acceptance criteria: NMT 10.0%
- Clarity of Solution
  Sample: 1.0 g
  Analysis: Dissolve the *Sample* in 2.0 mL of water, and heat.
  Acceptance criteria: The resulting solution is clear and remains transparent after cooling to room temperature.
- Bacterial Endotoxins Test ⟨85⟩: The level of bacterial endotoxins is such that the requirement under the relevant dosage form monograph(s) in which Hydroxypropyl Betadex is used can be met. Where the label states that Hydroxypropyl Betadex must be subjected to further processing during the preparation of injectable dosage forms, the level of bacterial endotoxins is such that the requirement under the relevant dosage form monograph(s) in which Hydroxypropyl Betadex is used can be met.
- Sterility Tests ⟨71⟩: Where the label states that Hydroxypropyl Betadex is sterile, it meets the requirements for *Sterility Tests* ⟨71⟩ in the relevant dosage form monograph(s) in which Hydroxypropyl Betadex is used.
- Conductivity
  Sample solution: 100 mg/mL of Hydroxypropyl Betadex, calculated on the dried basis in previously boiled and cooled to room temperature water
  Apparatus: Use a conductivity meter or resistivity meter that measures the resistance of the column of liquid between the electrodes of the immersed measuring device. The apparatus is supplied with alternating current to avoid the effects of electrode polarization. It is equipped with a temperature compensation device or a precision thermometer.
  Standard solutions: Prepare three standard solutions of potassium chloride containing 0.7455, 0.0746, and 0.0149 g, respectively, of potassium chloride per 1000.0 g of solution. These solutions should be prepared using water, which has been previously boiled and cooled to room temperature and has conductivity that does not exceed 2 µS · cm⁻¹. The conductivity and resistivity of these three *Standard solutions* at 20° are given in *Table 2*.

Table 2

| Concentration of Solution (g/1000.0 g) | Conductivity (µS · cm⁻¹) | Resistivity (Ω · cm) |
|---|---|---|
| 0.7455 | 1330 | 752 |
| 0.0746 | 133.0 | 7519 |
| 0.0149 | 26.6 | 37,594 |

Calibration
Samples: *Standard solutions*
Choose a conductivity cell that is appropriate for the conductivity of the solution to be examined. The higher the expected conductivity, the higher the cell constant that must be chosen. Commonly used conductivity cells have cell constants on the order of 0.1, 1, and 10 cm⁻¹.
Use a *Standard solution* of potassium chloride that is appropriate for the measurement. The conductivity value of the *Standard solution* of potassium chloride should be near the expected conductivity value of the *Sample solution*.
Rinse the cell several times with water, which has been previously boiled and cooled to room temperature, and at least twice with the *Standard solution* (potassium chloride solution) used for the determination of the cell constant of the conductivity cell.
Measure the resistance of the conductivity cell using the *Standard solution* (potassium chloride solution) at 20 ± 0.1°.
Calculate the constant of the conductivity cell, *C* (in cm⁻¹):

$$C = R_{KCl} \times K_{KCl}$$

$R_{KCl}$ = measured resistance, expressed in mega-ohms
$K_{KCl}$ = conductivity of the *Standard solution* of potassium chloride used, expressed in µS · cm⁻¹

Calibration acceptance criteria: The measured constant, *C*, of the conductivity cell must be within 5% of the given value.

Analysis
Sample: *Sample solution*
Rinse the conductivity cell several times with water, which has been previously boiled and cooled to room temperature, and at least twice with the *Sample solution*. Measure the conductivity of the *Sample solution*, while gently stirring with a magnetic stirrer.
Acceptance criteria: NMT 200 µS · cm⁻¹

ADDITIONAL REQUIREMENTS
- Packaging and Storage: Preserve in well-closed containers. Store at room temperature.
- Labeling: Label it to indicate the molar substitution (MS). Where Hydroxypropyl Betadex is intended for use in the manufacture of injectable dosage forms, it is so labeled. Where Hydroxypropyl Betadex must be subjected to further processing during the preparation of injectable dosage forms to ensure acceptable levels of bacterial endotoxins, it is so labeled. Where Hydroxypropyl Betadex is sterile, it is so labeled.

*Change to read:*

- USP Reference Standards ⟨11⟩
  USP Beta Cyclodextrin RS
  ▲ ▲ (CN 1-May-2018)
  USP Hydroxypropyl Betadex RS
  USP Propylene Glycol RS

Hydroxypropyl Cellulose

Portions of this monograph that are national *USP* text, and are not part of the harmonized text, are marked with symbols (♦♦) to specify this fact.

Cellulose, 2-hydroxypropyl ether [9004-64-2].

DEFINITION
Hydroxypropyl Cellulose is partly *O*-(2-hydroxypropylated) cellulose. It contains NLT 53.4% and NMT 80.5% of hydroxypropoxy groups, calculated on the dried basis. It may contain suitable anti-caking agents, such as silica.

IDENTIFICATION
- A. Infrared Absorption ⟨197K⟩: [Note—Disregard any peak at about 1719 cm⁻¹.]
- B.
  Sample: 1 g of Hydroxypropyl Cellulose
  Analysis: Dissolve the *Sample* in 100 mL of water. Transfer 1 mL of this solution to a glass plate, and allow the water to evaporate.
  Acceptance criteria: A thin film is formed.

ASSAY
- Hydroxypropoxy Groups
  Internal standard solution: Methylcyclohexane in *o*-xylene (1 in 50)

NF Monographs

HYDROXYPROPYL-BETA-CYCLODEXTRIN AND PROCESS FOR THE PRODUCTION THEREOF

This application is a National Stage Application of PCT/FR2019/051602 filed Jun. 28, 2019, which claims priority from French Patent Application Nos. 18 55952, filed on Jun. 29, 2018 and 19 02375, field Mar. 8, 2019. The priority of said PCT and French Patent Applications are claimed. Each of the prior mentioned applications is hereby incorporated by reference herein in its entirety.

The present invention relates to a novel hydroxypropyl-β-cyclodextrin (HPβCD) and also to a novel process useful for the preparation thereof. The invention also relates to the use of this HPβCD as an excipient. The invention also relates to an HPβCD, for its use as a medicament, and more particularly for the treatment or prevention of diseases or conditions associated with overload, and/or with storage and/or with accumulation of cholesterol in the tissues, and also the consequences thereof, such as certain disorders of the central nervous system or of the cardiovascular system.

CONTEXT OF THE INVENTION

Cyclodextrins are cyclic oligosaccharides resulting from the enzymatic degradation of starch. The three most common natural cyclodextrins are made up of 6, 7 or 8 α-D-glucopyranose units in chair configuration, linked to one another by α-1,4 bonds. They are more commonly referred to as α,β, or γcyclodextrin, respectively. Their three-dimensional structure appears in the form of a truncated cone on the outside of which are the hydroxyl groups representing the highly hydrophilic part of cyclodextrins. The interior of the cone or the cavity of cyclodextrins is made up of the hydrogen atoms borne by the $C_3$ and $C_5$ carbons and also of the oxygen atoms which participate in the glycosidic bond, thus conferring on them a nonpolar nature.

Cyclodextrins having a hydrophilic external part and a hydrophobic cavity are generally used for their ability to encapsulate lipophilic compounds or groups and, therefore, for their role of protector and of solubilizer of these lipophilic compounds or compounds bearing lipophilic groups. They are thus conventionally found in the fields of food processing, but also in galenics, where they are used as an excipient in pharmaceutical formulations.

The anhydroglucose units of cyclodextrins each comprise 3 reactive hydroxyl groups, which are borne by the C2, C3 and C6 carbons. Numerous derivatives have thus already been synthesized by grafting different groups onto these hydroxyl functions, among which mention may be made of hydroxypropyl cyclodextrins, methyl cyclodextrins and sulfoalkyl cyclodextrins.

Hydroxypropyl-beta-cyclodextrin (HPβCD) in particular is widely used in galenics, for the oral or parenteral delivery of active ingredients.

Conventionally, the HPβCD is obtained by reacting a β-cyclodextrin with propylene oxide in a basic medium, then the reaction is neutralized by adding hydrochloric acid.

The crude reaction product is then purified in order to reduce the impurities, that is to say typically:

- the reagents, such as residual (unsubstituted) β-cyclodextrin;
- the reaction co-products such as salts, propylene glycol (propane-1,2-diol), dipropylene glycol;
- the degradation products of β-cyclodextrin or the linear forms thereof;
- microbiological products such as endotoxins.

This purification is carried out by means of one or more treatments such as filtration, decoloration, demineralization, washing with ethanol, extraction with acetone, dialysis.

From a regulatory point of view, the required degree of purification is high, in particular when the HPβCD is intended for the pharmaceutical market. These regulatory requirements are even greater as the route of administration is invasive.

In particular, it is known that HPβCD could have a positive effect on certain diseases of the central nervous system (CNS), for example on certain orphan diseases such as Niemann-Pick disease type C. In these pathologies, the intrathecal route is preferred, and the safety requirements are very high.

Thus, preferably, the HPβCD should have an average degree of molar substitution (MS) at most equal to 0.71, preferably in a range of from 0.50 to 0.71, and have the fewest possible impurities. Among these impurities, the residual β-cyclodextrin (β-CD) has been identified as being capable of taking on a toxic character.

A notable technical difficulty lies in reconciling this MS range with a low content of residual β-CD. Indeed, this MS range is particularly low. The preparation of a low MS HPβCD conventionally means that less hydroxypropylation reagent is used. It follows therefrom that the reaction product contains more unreacted β-CD, i.e. residual β-CD.

However, this β-CD is difficult to eliminate. And when, however, its content is successfully reduced, this leads to an increase in the MS, since the latter is determined on the basis of all the cyclodextrin molecules, including the unsubstituted β-CD.

Furthermore, after the hydroxypropylation, it is also necessary to reduce the reaction co-products, such as for example propylene glycol or dipropylene glycol. This causes a further increase in the proportion of β-CD, since the elimination of these other co-products decreases the total dry mass of the HPβCD. After hydroxypropylation, the propylene glycol content is, for example, indeed typically at least equal to 5.0% by dry weight.

It is thus difficult to produce HPβCDs having a predetermined MS and a predetermined β-CD content, in particular considering that this MS should be at most equal to 0.71, and that the β-CD content should be as low as possible. This difficulty increases when it is also desired to minimize the reaction co-products such as propylene glycol and dipropylene glycol.

In application WO 2016/201137 (VTESSE), various methods for purifying HPβCD have been proposed, comprising complexation with organic compounds, precipitation, absorption chromatography on alumina. In this patent application, HPβCDs having reduced β-CD contents and an MS of less than 0.71 were able to be obtained. However, all the purification processes making it possible to achieve this used organic solvents such as acetone or methanol.

The use of these organic solvents is particularly restrictive, insofar as the use thereof requires strict supervision in order in particular to ensure the safety of the handlers. Moreover, these solvents are found as an impurity in the final product and represent a risk of toxicity for the consumer.

It results therefrom that there was an unmet need to provide an HPβCD with a low MS, in particular less than or equal to 0.71, having improved safety, and in particular when the latter is intended to be injected, for example intravenously or intrathecally.

OBJECTIVE OF THE INVENTION

One objective of the present invention is to provide an HPβCD having an improved quality, in particular for the use thereof as an excipient or as an active pharmaceutical ingredient.

Another objective of the present invention is to provide an HPβCD which is particularly effective, notably with respect to the solubilization or stabilization of active agents, in particular of active pharmaceutical ingredients.

Another objective of the present invention is to provide an HPβCD with an MS at most equal to 0.71 having reduced contents of residual β-CDs, which, in contrast to those of the prior art, may be free of undesirable organic solvents such as methanol, ethanol, acetone, acetonitrile and chloroform.

PRESENTATION OF THE INVENTION

The Applicant has achieved this after numerous studies which have culminated in the development of an HPβCD having an MS at most equal to 0.71, and a β-CD content of at most 0.3% (dry/dry), preferably less than or equal to 0.2% (dry/dry).

Furthermore, the HPβBCD in accordance with the invention may have remarkable application properties, in particular regarding the stabilization of pharmaceutically active proteins.

This HPβCD may advantageously be free from organic solvents which conventionally result from HPβCD purification processes, unlike the HPβCDs used in patent application WO 2016/201137.

In fact, the HPβCD of the invention may be advantageously obtained according to a new process carried out in an aqueous medium. In a novel manner, the solution lies in the hydroxypropylation step more than in the purification steps. In particular, the Applicant has shown that the judicious choice of the hydroxypropylation parameters made it possible to attain the HPβCD of the invention.

It is thus possible to dispense with purification steps involving undesired organic solvents, which are inevitably found in the final product. Purification steps carried out in an aqueous medium are sufficient. The HPβCD thus obtained has an MS not exceeding 0.71, and in particular within a range of 0.50 to 0.71. Its β-CD content is reduced, and does not exceed 0.3%, preferably 0.2%. Undesirable reaction co-products such as propylene glycol and dipropylene glycol can also be reduced.

SUMMARY OF THE INVENTION

A first subject of the present invention is thus a hydroxypropyl-beta-cyclodextrin (HPβCD) characterized:

in that it has an average degree of molar substitution (MS) of less than or equal to 0.71; and in that it has a β-cyclodextrin (β-CD) content of less than or equal to 0.3%, preferably less than or equal to 0.2% by dry weight.

Another subject of the present invention is a process for preparing HPβCD, particularly useful for the preparation of an HPβCD of the invention, characterized in that it comprises:

a step (a) of preparing an aqueous solution comprising beta-cyclodextrin (β-CD) and sodium hydroxide, the amount of sodium hydroxide used being less than 3.7% by dry weight of sodium hydroxide, relative to the dry weight of β-CD;

a step (b) of adding propylene oxide to the solution obtained in step (a), characterized in that:

the temperature of the solution obtained in step (a), before introduction of the propylene oxide, is chosen within the range of from 80° C. to 120° C.;

the propylene oxide/anhydroglucose molar ratio used is chosen within the range of from 0.70/1.00 to 0.86/1.00;

the rate of addition of propylene oxide is chosen within the range of from 0.15 to 0.30 kg/h/kg of β-CD;

a purification step (c), characterized in that it does not use organic solvents;

a step (d) of recovering the HPβCD thus obtained.

Another subject of the present invention is an HPβCD capable of being obtained according to the HPβCD preparation process of the invention.

The present invention also relates to the use of an HPβCD according to the invention as a medicament and/or as an excipient, and/or to encapsulate a substance, and/or solubilize a substance in an aqueous medium, and/or to improve the chemical stability of a substance, and/or to improve the delivery of a substance to and through biological membranes, and/or to increase the physical stability of a substance, and/or to formulate a substance from a liquid form to a powder form, and/or to prevent interactions of one substance with another substance, and/or to reduce local irritation after topical or oral administration of a substance, and/or to prevent the absorption of a substance in certain tissues such as the skin, and/or to obtain a sustained release of a substance, and/or to mask the taste of a substance, in particular its bitterness, and/or to mask the odor of a substance, and/or to modify the bioavailability of a substance.

BRIEF DESCRIPTION OF THE DRAWINGS

FIGS. 1, 2 and 3

FIG. 1 presents the Monograph of Hydroxypropyl betadex (HPβCD) from USP 41 NF 36, and is an integral part of the description of the patent application.

FIG. 2 presents the Monograph of Hydroxypropyl betadex (HPβCD) from USP 41 NF 36, and is an integral part of the description of the patent application.

FIG. 3 presents the Monograph of Hydroxypropyl betadex (HPβCD) from USP 41 NF 36, and is an integral part of the description of the patent application.

DETAILED DESCRIPTION OF THE INVENTION

Thus, the present invention relates to a hydroxypropyl-beta-cyclodextrin (HPβCD) characterized in that it has an average degree of molar substitution (MS) less than or equal to 0.71, a β-cyclodextrin (β-CD) content of less than or equal to 0.3% by dry weight.

It is commonly understood that the expression "HPβCD" conventionally covers a mixture of HPβCD molecules, and also substances resulting from its preparation process. In fact, as opposed to a chemical substance with a well-defined structure, HPβCD generally corresponds to a mixture of HPβCD molecules having different substitution profiles and patterns, and therefore which are structurally different.

The HPβCD of the invention is firstly characterized by its average degree of molar substitution (MS), which is less than or equal to 0.71. Preferably, this MS is chosen within the range of from 0.50 to 0.71. It is more preferably less than or equal to 0.70, preferably less than or equal to 0.69.

Preferably, this MS is at least equal to 0.58, i.e. chosen within the range of from 0.58 to 0.71. Furthermore, this MS is generally at least equal to 0.60, even at least equal to 0.65. It is typically equal to 0.66, or equal to 0.67, or equal to 0.68 or equal to 0.69.

It is recalled here that the “average degree of molar substitution (MS)” corresponds to the average number of hydroxypropyl groups, per anhydroglucose unit. It should be noted that the MS is different from the average degree of molecular substitution (DS) which corresponds to the average number of hydroxypropyl groups per cyclodextrin molecule, and which is therefore a function of the number of anhydroglucose units constituting the starting cyclodextrin. Thus, for the HPβCD, the DS is equal to 7 times the MS, since the β-cyclodextrins consist of 7 anhydroglucose units.

The MS can be conventionally determined by those skilled in the art by proton Nuclear Magnetic Resonance (NMR), preferably according to the “Hydroxypropyl Betadex; Molar substitution” method of USP 41 NF 36 reproduced in the appendix.

As disclosed above, this mixture conventionally contains residual native beta-cyclodextrin (β-CD) molecules, i.e. molecules that are non-hydroxypropylated but which are advantageously reduced in the HPβCD of the invention.

Thus, the HPβCD of the invention has a β-CD content of less than or equal to 0.3%, preferably less than or equal to 0.2%, preferably less than or equal to 0.1%, this percentage being expressed as dry weight of β-CD, relative to the total dry weight of HPβCD.

This residual β-CD content can be conventionally determined by those skilled in the art by high-performance liquid chromatography (HPLC), preferably according to a procedure in accordance with the method of USP 41 NF 36 (“Hydroxypropyl Betadex; limit of betadex, propylene glycol, and other related substances”) reproduced in the appendix.

Preferably, the substitution patterns of the HPβCD in accordance with the invention are such that:

- the proportion of unsubstituted (no-OHP) moieties is:
  - at least equal to: 25.0%, preferably 30.0%, preferably 35.0%, preferably 40.0%; and/or,
  - at most equal to: 55.0%, preferably 52.0%, preferably 50.0%, preferably 49.0%, preferably 48.0%; and/or,
- the proportion of C2 substituted (2 OHP) moieties is:
  - at least equal to: at 15.0%, preferably 20.0%, preferably 24.0%, preferably 25.0%, preferably 26.0%, preferably 27.0%, preferably 28.0%, preferably 28.5%; and/or,
  - at most equal to: 35.0%, preferably 31.0%, preferably 30.5%; and/or,
- the proportion of C3 substituted (3 OHP) moieties is:
  - at least equal to: 5.0%, preferably 6.0%, more preferably 7.0%; and/or
  - at most equal to: 10.0%, preferably 9.0%, preferably 8.0%; and/or,
- the proportion of C6 substituted (OHP) moieties is:
  - at least equal to: 1.0%, even 2.0%; and/or
  - at most equal to: 10.0%, preferably 7.0%, preferably 6.0%, preferably 5.0%, preferably 4.0%; and/or,
- the proportion of C2 and C3 substituted (2,3-di-OHP) moieties is:
  - at least equal to: 5.0%, preferably 8.0%, preferably 9.0%; and/or,
  - at most equal to: 25.0%, preferably 20.0%, preferably 15.0%, preferably 12.0%, preferably 11.0%, preferably 10.0%; and/or,
- the proportion of C2 and C6 substituted (2,6-di-OHP) moieties is:
  - at least equal to: 1.0%, preferably 2.0%; and/or,
  - at most equal to: 10.0%, preferably 6.0%, preferably 5.0%, preferably 4.0%; and/or,
- the proportion of twice C3 substituted (3,3'-di-OHP) moieties is:
  - at least equal to: 0.2%, preferably 0.3%, more preferably 0.5%; and/or
  - at most equal to: 2.0%, preferably 1.5%, preferably 1.0%, preferably 0.8%; and/or
- the proportion of C2, C3 and C6 substituted (2,3,6-tri-OHP) moieties is:
  - at least equal to: 0.5%, preferably 0.6%, preferably 0.7%, preferably 0.8%; and/or,
  - at most equal to: 4.0%, preferably 3.0%, more preferably 2.0%, preferably 1.5%, preferably 0.8%.

These percentages correspond to the percentages of anhydroglucose units having the type of substitution considered. For example, for a 2 OHP value equal to 30.0%, it is estimated that 30.0 mol % of the anhydroglucose units of the HPβCD are substituted by a hydroxypropyl group at the C2 carbon. As a further example, for a 3,3'-di-OHP value equal to 0.4%, it is estimated that 0.4 mol % of the anhydroglucose units of the HPβCD are substituted twice at the C3 carbon (that is to say that the C3 carbon bears two hydroxypropyl groups). As a last example, for a 2,6-di-OHP value equal to 5.0%, it is estimated that 5.0 mol % of the anhydroglucose units of the HPβCD are substituted by a hydroxypropyl group both at the C2 carbon, and at the C6 carbon. For the first example, mention will be made of mono-substitution, whereas mention will be made of di-substitution for the last two examples.

Preferably, the HPβCD in accordance with the invention comprises less than 5.0% of substitutions other than those listed above, for example 3,6-OHP substitutions, preferably less than 4.0%, preferably less 3.0%, preferably less than 2.0%, preferably less than 1.0%, preferably less than 0.5%. More preferably, the HPβCD of the invention comprises no other types of substitutions than those listed above. The expression “no other types of substitutions” is understood to mean that the anhydroglucose units comprising such substitutions are not detectable, in particular by the “Hakomori” method, said method comprising subjecting the HPβCD to the following successive steps: permethylation, hydrolysis, reduction, peracetylation.

Preferably, the HPβCD substitution patterns in accordance with the invention are such that:

- the proportion of substitutions corresponding to mono-substitutions is:
  - at least equal to: 60%, preferably 70%, preferably 73%, and/or
  - at most equal to: 80%, even 78%, even 77%, even 78%; and/or,
- the proportion of substitutions corresponding to di-substitutions is:
  - at least equal to: 15%, even 20%, even 22%, even 23%; and/or,
  - at most equal to: 40%, preferably 35%, preferably 30%, preferably 28%, preferably 26%, preferably 25%; and/or
- the proportion of substitutions corresponding to tri-substitutions is:
  - at least equal to: 1%, even 2%; and/or,
  - at most equal to: 5%, preferably 4%, preferably 3%, even 2%; and/or,
- the C2/C6 substitutions ratio is:
  - at least equal to: 2.0, preferably 3.0, preferably 4.0, preferably 5.0; and/or, at most equal to: 10.0, even 8.0, even 7.5; and/or, the C2/C3 substitutions ratio is:

at least equal to: 1.5, preferably 2.0, preferably 2.1, preferably 2.2; and/or, at most equal to: 3.0 even 2.5.

These substitution patterns can be determined by those skilled in the art, for example according to a method analogous to the "Hakomori" method, typically by subjecting the HPβCD to the following successive steps: permethylation, hydrolysis, reduction, peracetylation.

It is possible for example to follow the method as described in patent U.S. Pat. No. 5,096,893, column 6, example 9 to column 7, example 10 inclusive, said method being incorporated by reference. Typically, the method according to patent U.S. Pat. No. 5,096,893 is as follows:

Sodium hydride (0.07 mol) is added to anhydrous dimethyl sulfoxide (20 ml) under argon and the mixture is heated for 1 hour at about 60° C. Then, the HPβCD (4 g) which has been dried (3 hours at 110° C.) and dissolved in dimethyl sulfoxide (15 ml) is added and placed under argon with stirring at room temperature for 3 hours. The reaction medium is cooled in an ice bath and methyl iodide (10 ml, 0.161 mol) is added dropwise. After another hour in an ice bath, the mixture is left under stirring overnight. Then water (24 ml) is added while cooling and the product is extracted twice with chloroform (90 ml in total). The extract is washed with water (20 ml) and evaporated. The residue is treated with water (25 ml) and extracted three times with ether (75 ml in total). The extract is washed with water and then evaporated. The residue is dissolved in ether (100 ml), then stirred for 30 minutes in the presence of neutral alumina, filtered, then evaporated, until typically 3.7 g of the permethylated product is obtained. 3 mg of the permethylated product is dissolved in aqueous trifluoroacetic acid (0.5 ml), then stored in a screw-cap tube at 100° C. overnight, and concentrated by rinsing with air. The residue and sodium borohydride (100 mg) are dissolved in aqueous ammonia (0.5 ml) and the solution is placed at room temperature for one hour. The solution is acidified with 50% acetic acid (2 drops), and then concentrated. Boric acid is evaporated by co-distillation, first with an acetic acid/methanol mixture (1:9, 5 ml) and then with methanol (25 ml). The residue is treated with acetic anhydride and pyridine (2:1, 0.5 ml) at 100° C. for 30 minutes, concentrated, and separated between chloroform and water (2:1, 6 ml). The chloroform phase is concentrated and the residue is analyzed by gas chromatography and gas-liquid chromatography coupled with mass spectrometry (GLC-MS). The gas-liquid chromatography is performed for example on Hewlett Packard 5830 A equipment fitted with a flame ionization detector, using hydrogen as carrier gas. Gas-liquid chromatography coupled with mass spectrometry is performed for example on a Hewlett Packard 5790-5970 system, using helium as carrier gas. A capillary column (length 25 m, internal diameter 0.20 mm) made of (crosslinked 5% methylphenylsilicone) fused glass, for example of Hewlett Packard Ultra 2 type, is used. The temperature is programmed as follows: 8 minutes at 185° C., →250° C. at 5° C. per minute, 250° C. for 10 minutes.

The inventors have found that the performance of HPβCD was increased when the HPβCD had specific substitution patterns. More specifically, the inventors have shown that the stabilization of proteins, in particular of proteins of therapeutic interest (hormones, antibodies, etc.), was improved.

Preferably the HPβCD in accordance with the invention has the following organic solvent contents:

less than 2000 ppm of d-limonene, preferably less than 1000 ppm, preferably less than 500 ppm, preferably less than 200 ppm, preferably less than 100 ppm, preferably less than 50 ppm, preferably less than 10 ppm;

less than 2000 ppm of ethanol, preferably less than 1000 ppm, preferably less than 500 ppm, preferably less than 200 ppm, preferably less than 100 ppm, preferably less than 50 ppm, preferably less than 10 ppm;

less than 2000 ppm of methanol, preferably less than 1000 ppm, preferably less than 500 ppm, preferably less than 200 ppm, preferably less than 100 ppm, preferably less than 50 ppm, preferably less than 10 ppm;

less than 2000 ppm of acetonitrile, preferably less than 1000 ppm, preferably less than 500 ppm, preferably less than 200 ppm, preferably less than 100 ppm, preferably less than 50 ppm, preferably less than 10 ppm;

less than 2000 ppm of acetone, preferably less than 1000 ppm, preferably less than 500 ppm, preferably less than 200 ppm, preferably less than 100 ppm, preferably less than 50 ppm, preferably less than 10 ppm;

less than 2000 ppm of chloroform, preferably less than 1000 ppm, preferably less than 500 ppm, preferably less than 200 ppm, preferably less than 100 ppm, preferably less than 50 ppm, preferably less than 10 ppm;

these contents being expressed in dry weight of said organic solvents relative to the total dry weight of the HPβCD.

These organic solvent contents can be conventionally determined by a person skilled in the art by gas chromatography with detection by mass spectrometry (GC/MS), preferably by carrying out the analyses by headspace GC/MS. It is for example possible to follow the method as described in the Examples in section A.

Most preferably, the HPβCD in accordance with the invention does not contain detectable amounts of d-limonene, and/or of ethanol, and/or of methanol, and/or of acetonitrile, and/or of acetone and/or of chloroform.

Preferably, the HPβCD in accordance with the invention also has the following organic solvent contents:

less than 2000 ppm of p-xylene, preferably less than 1000 ppm, preferably less than 500 ppm, preferably less than 200 ppm, preferably less than 100 ppm, preferably less than 50 ppm, preferably less than 10 ppm; and/or less than 2000 ppm of toluene, preferably less than 1000 ppm, preferably less than 500 ppm, preferably less than 200 ppm, preferably less than 100 ppm, preferably less than 50 ppm, preferably less than 10 ppm; and/or less than 2000 ppm of l-menthol, preferably less than 1000 ppm, preferably less than 500 ppm, preferably less than 200 ppm, preferably less than 100 ppm, preferably less than 50 ppm, preferably less than 10 ppm; and/or less than 2000 ppm of trichlorethylene, preferably less than 1000 ppm, preferably less than 500 ppm, preferably less than 200 ppm, preferably less than 100 ppm, preferably less than 50 ppm, preferably less than 10 ppm, preferably less than 5 ppm, preferably less than 1 ppm;

Most preferably, the HPβCD of the invention does not contain detectable amounts of p-xylene, and/or of toluene, and/or of l-menthol, and/or of trichlorethylene.

Preferably, the HPβCD in accordance with the invention has a total content of class 1 organic solvents according to the "<467> Residual solvents" section of the general chapter of USP 41 NF 36 of less than 2000 ppm, preferably less than 1000 ppm, preferably less than 500 ppm, preferably less than 200 ppm, preferably less than 100 ppm, preferably less than 50 ppm, preferably less than 10 ppm.

Preferably, the HPβCD in accordance with the invention has a total content of class 2 organic solvents according to the "<467> Residual solvents" section of the general chapter of USP 41 NF 36 of less than 2000 ppm, preferably less than 1000 ppm, preferably less than 500 ppm, preferably less than 200 ppm, preferably less than 100 ppm, preferably less than 50 ppm, preferably less than 10 ppm.

Preferably, the HPβCD in accordance with the invention has a total content of class 3 organic solvents according to the "<467> Residual solvents" section of the general chapter of USP 41 NF 36 of less than 2000 ppm, preferably less than 1000 ppm, preferably less than 500 ppm, preferably less than 200 ppm, preferably less than 100 ppm, preferably less than 50 ppm, preferably less than 10 ppm.

As an alternative or in addition to the characterization by contents of organic solvents, HPβCD can be defined by the fact that it is obtainable, or is obtained, by a process of hydroxypropylation and purification excluding the use of organic solvents, i.e. entirely carried out in an aqueous medium.

Preferably, the HPβCD in accordance with the invention has the following substitution profile, as determined by electrospray ionization-mass spectrometry (ESI-MS):

- signal corresponding to unsubstituted β-CD (HP0): equal to 0.0%; and/or
- signal corresponding to HPβCD molecules having a degree of substitution equal to 1 (HP1): less than or equal to 3%, preferably less than or equal to 1%, preferably equal to 0%; and/or
- signal corresponding to the molecules of HPβCD having a degree of substitution equal to 2 (HP2): less than or equal to 5%, preferably in a range of from 0 to 4%, preferably of from 1 to 3%, and/or
- signal corresponding to the molecules of HPβCD having a degree of substitution equal to 3 (HP3): in a range of from 1 to 10%, preferably from 2 to 8%, preferably from 3 to 7%; and/or
- signal corresponding to HPβCD molecules having a degree of substitution equal to 4 (HP4): in a range of from 5 to 20%, preferably from 7 to 17%, preferably from 9 to 15%; and/or
- signal corresponding to HPβCD molecules having a degree of substitution equal to 5 (HP5): in a range of from 10 to 30%, preferably from 15 to 25%, preferably from 17 to 25%; and/or
- signal corresponding to HPβCD molecules having a degree of substitution equal to 6 (HP6): in a range of from 15 to 35%, preferably from 20 to 30%, preferably from 24.0 to 28.0%; and/or
- signal corresponding to HPβCD molecules having a degree of substitution equal to 7 (HP7): in a range of from 10 to 30%, preferably from 15 to 25%, preferably from 17 to 25%; and/or
- signal corresponding to HPβCD molecules having a degree of substitution equal to 8 (HP8): in a range of from 5 to 20%, preferably from 5 to 15%, preferably from 6 to 13%; and/or
- signal corresponding to the molecules of HPβCD having a degree of substitution equal to 9 (HP9): in a range of from 1 to 10%, preferably from 2 to 8%, preferably from 2 to 6%; and/or
- signal corresponding to HPβCD molecules having a degree of substitution equal to 10 (HP10): less than 5%, preferably less than 2%, preferably less than or equal to 1%, preferably equal to 1%; and/or
- signal corresponding to HPβCD molecules having a degree of substitution greater than or equal to 11 (HP≥11): less than or equal to 2%, preferably less than or equal to 1%, preferably equal to 0%;
- these percentages being expressed relative to the sum of the signals obtained for each degree of substitution for which the signal was greater than that of the background noise.

It is of course accepted that the term "signal" means the area under the curve of the ion(s) corresponding to the degree(s) of substitution of interest.

In the present description, the substitution profile is determined by ESI-MS, preferably, by taking the average of the measurements performed in triplicate. For the determination of this substitution profile, it is possible in particular to follow the method as described below in the Examples, at section A.

Preferably, the HPβCD in accordance with the invention has a propylene glycol content of less than or equal to 5.00%, this percentage being expressed by dry weight of propylene glycol relative to the total dry weight of the HPβCD. This propylene glycol content is preferably less than or equal to 2.50%, preferably less than or equal to 1.00%, preferably less than or equal to 0.50%, preferably less than or equal to 0.10%, preferably less than or equal to 0.05%.

This propylene glycol content can be conventionally determined by those skilled in the art by high-performance liquid chromatography (HPLC), preferably according to a procedure in accordance with the method of USP 41 NF 36 reproduced in the appendix ("Hydroxypropyl Betadex monograph; limit of betadex, propylene glycol, and other related substances").

Preferably, the HPβCD in accordance with the invention has a dipropylene glycol content of less than or equal to 0.10%, this percentage being expressed by dry weight of dipropylene glycol relative to the total dry weight of the HPβCD. This dipropylene glycol content is preferably less than or equal to 0.05%, preferably less than or equal to 0.03%. It lies for example in a range of from 0.01 to 0.05%.

Preferably, the HPβCD in accordance with the invention has a reducing sugar content of less than or equal to 1.0%, this percentage being expressed by dry weight of reducing sugars relative to the total dry weight of the HPβCD. Preferably, this reducing sugar content is less than or equal to 0.5%, preferably less than or equal to 0.1%.

This reducing sugar content can be conventionally determined by a person skilled in the art by the Bertrand method, for example according to the method as described in the Examples, in section A below.

Generally and advantageously, the HPβCD in accordance with the invention has a chloride content of less than or equal to 1000 ppm, this content being expressed by dry weight of chloride ions relative to the total dry weight of the HPβCD. Preferably, this chloride content is less than or equal to 500 ppm, preferably less than or equal to 100 ppm, preferably less than or equal to 50 ppm, preferably less than 50 ppm.

This chloride content can be conventionally determined by a person skilled in the art by potentiometric titration of a solution of HPβCD by means of a solution of silver nitrate of known concentration.

Preferably, the HPβCD in accordance with the invention has a maximum absorbance, from 230 to 400 nm, of less than or equal to 1.00; said maximum absorbance being measured on the basis of a distilled water solution containing 2.50 g (dry) of HPβCD per 100 ml of solution, using a cell having an optical path length of 10 mm. Preferably, this maximum absorbance is less than 0.50, preferably less than 0.10, preferably less than 0.05, for example in a range of 0.01 to 0.50.

In an advantageous embodiment, the HPβCD of the invention is in pulverulent form. In this case, it advantageously exhibits a loss of mass on drying (or "moisture content") of less than or equal to 10.0%, preferably less than or equal to 5.0%, for example chosen from a range of from 2.0 to 5.0%.

This water content can be conventionally determined by a person skilled in the art by measuring the loss of mass on drying, preferably according to a procedure in accordance with the method of USP 41 NF 36 reproduced in the appendix ("Hydroxypropyl betadex monograph; loss on drying").

This pulverulent form is advantageous in particular regarding the storage and transportation of HPβCD.

Advantageously, this pulverulent HPβCD is in the form of an atomized product, that is to say in the form of a powder obtained by spray drying a solution of HPβCD.

Preferably, the HPβCD in accordance with the invention has a pH in a range of from 5.0 to 7.5; said pH being measured on the basis of a solution of HPβCD consisting of 2 g of dry HPβCD, 98 g of distilled water and 0.3 ml of a 225 g/L solution of potassium chloride.

Preferably, the HPβCD in accordance with the invention has a conductivity of less than or equal to 200 μS/cm, said conductivity being measured on the basis of a distilled water solution containing 10% (dry) of HPβCD. Preferably, this conductivity is less than or equal to 100 μS/cm, preferably less than or equal to 50 μS/cm, preferably less than or equal to 25 μS/cm, preferably less than or equal to 10 μS/cm. This conductivity is for example in a range of from 1 to 10 μS/cm, even from 2 to 5 μS/cm.

This conductivity can be conventionally determined by a person skilled in the art according to a procedure in accordance with the method described in USP 41 NF 36 reproduced in the appendix ("Hydroxypropyl betadex monograph; conductivity"). It is possible, for example, to follow the method described in the examples in section A below.

Preferably, the HPβCD in accordance with the invention has a content of impurities related to HPβCD other than propylene glycol and β-CD of less than 0.5%, preferably less than 0.1%.

This content of impurities related to HPβCD other than propylene glycol and β-CD can be conventionally determined by a person skilled in the art by high-performance liquid chromatography (HPLC), preferably according to a procedure in accordance with the method of USP 41 NF 36 ("limit of betadex, propylene glycol, and other related substances") reproduced in the appendix, it being understood that the impurities related to HPβCD other than propylene glycol and β-CD correspond to the "other related substances" in said method.

Preferably, the HPβCD in accordance with the invention is also in accordance with the US monograph as in force on Jun. 1, 2018. Preferably, the HPβCD of the invention is also in accordance with the Chinese monograph as in force on Jun. 1, 2018. Preferably, the HPβCD of the invention is also in accordance with the European monograph as in force on Jun. 1, 2018.

Another subject of the present invention is a process for preparing HPβCD, particularly useful for the preparation of an HPβCD as described above, characterized in that it comprises:

- a step (a) of preparing an aqueous solution comprising beta-cyclodextrin (β-CD) and sodium hydroxide, the amount of sodium hydroxide used being less than 3.7% by dry weight of sodium hydroxide, relative to the dry weight of β-CD;
- a step (b) of adding propylene oxide to the solution obtained in step (a), characterized in that:
  - the temperature of the solution obtained in step (a), before introduction of the propylene oxide, is chosen within the range of from 80° C. to 120° C.;
  - the propylene oxide/anhydroglucose molar ratio used is chosen within the range of from 0.70/1.00 to 0.86/1.00;
  - the rate of addition of propylene oxide is chosen within the range of from 0.15 to 0.30 kg/h/kg of β-CD;
- a purification step (c), characterized in that it does not use organic solvents;
- a step (d) of recovering the HPβCD thus obtained.

Preferably, the dry mass of β-CD in the solution of step (a) is chosen within the range of from 30 to 70% by weight, this percentage being expressed by dry weight of β-CD relative to the total weight of the solution. Preferably, this dry mass of β-CD is chosen within the range of from 40 to 60%, preferably from 45 to 55%, preferably from 50 to 55%.

Preferably, the amount of sodium hydroxide in the solution of step (a) is chosen within the range of from 0.5 to 3.6% by dry weight of sodium hydroxide, relative to the dry weight of β-CD. More preferably, this amount of sodium hydroxide is greater than or equal to 1.0%, preferably greater than or equal to 1.2%, preferably greater than or equal to 1.3%, preferably greater than or equal to 1.4%, preferably greater than or equal to 1.5%, even greater than or equal to 1.6%, even greater than or equal to 1.7%, even greater than or equal to 1.8%, even greater than or equal to 1.9%, even greater than or equal to 2.0%, even greater than or equal to 2.1%, even greater than or equal to 2.2%, even greater than or equal to 2.3%, even greater than or equal to 2.4%, even greater than or equal to 2.5%, even or equal to 2.6%, even greater than or equal to 2.7%, even greater than or equal to 2.8%, even greater than or equal to 2.9%. Preferably, this amount of sodium hydroxide is less than or equal to 3.5%, preferably less than or equal to 3.4%, preferably less than or equal to 3.3%, preferably less than or equal to 3.2%, preferably less than or equal to 3.1%, preferably less than or equal to 3.0%, preferably less than or equal to 2.9%.

Preferably, in step (b), the temperature of the aqueous solution of β-CD, before introduction of the propylene oxide, is greater than or equal to 85° C., preferably greater than or equal to 90° C. This temperature is also preferably less than or equal to 110° C., preferably less than or equal to 100° C. It is for example chosen within the range of from 90 to 100° C., preferably ranging from 94 to 96° C. It is for example equal to approximately 95° C.

Preferably, in step (b), the propylene oxide/anhydroglucose molar ratio used is greater than or equal to 0.75/1.00, preferably greater than or equal to 0.80/1.00, preferably greater than or equal to 0.82/1.00, preferably greater than or equal to 0.84/1.00, preferably equal to 0.85/1.00.

Preferably, in step (b), the rate of addition of propylene oxide is chosen within the range of from 0.20 to 0.30 kg/h/kg of β-CD, preferably of from 0.20 to 0.25 kg/h/kg of β-CD, preferably of from 0.21 to 0.23 kg/h/kg of β-CD, for example equal to 0.22 kg/h/kg of β-CD.

The reaction can then be neutralized, for example by adding hydrochloric acid.

For carrying out step (c), the HPβCD obtained in step (b) can undergo one or more treatments, typically chosen from filtration, nanofiltration, treatment with activated carbon and demineralization.

Preferably, this purification comprises the following treatments, preferably carried out in this order:

(b.1) decoloration;

(b.2) filtration(s);

(b.3) membrane purification.

Preferably, the decoloration step (b.1) is carried out by means of an activated carbon treatment, typically carried out in batch mode. Preferably, this treatment is carried out for at least 1 hour, at 70° C.±5° C.

Preferably, step (b.2) comprises at least one step of filtration through a bag filter. Preferably, step (b.2) comprises at least one step of filtration through a 0.22 μm cartridge filter. Preferably, step (b.2) comprises at least one step of filtration through a 0.1 μm cartridge filter, preferably prior to the one optionally carried out on a 0.22 μm cartridge filter.

Preferably, the membrane purification step (b.3) is carried out by nanofiltration, preferably by means of a nanofiltration module equipped with a membrane having a cutoff threshold of less than 800 Da or a nominal retention rate of greater than 65% CaCl2, at a pressure below 35 bar and at a temperature above 45° C.

Preferably, the purification further comprises a demineralization step (b.4) advantageously comprising a step of passing through a cation exchange column, then through an anion exchange column. Preferably, the demineralization further comprises a passage through a mixed bed. Preferably, step (b.4) is carried out so that the resistivity of the product at the outlet is greater than 500 000 Ω·cm.

Preferably, the treatments (b.1) and (b.2) are repeated after the membrane purification (b.3), or optionally after the demineralization treatment (b.4) when this is carried out.

Advantageously, in particular when it is desired to obtain a pulverulent HPβCD, the process of the invention comprises, after the purification, a step of drying the hydroxypropylated and optionally purified product. This drying step can be carried out by any technique known to those skilled in the art, typically by evaporation or by spray drying, preferably by spray drying.

This spray drying may be single-stage or multi-stage spray drying. In the case of multi-stage spray drying, the spray dryer is coupled to a fluidized bed, optionally integrated with the spray-drying tower, which makes it possible to agglomerate the particles formed by spray drying. The latter process is particularly beneficial if it is desired to obtain powders of greater mean diameter and depending on the flow desired for the resulting powder.

The HPβCD of the invention can be used in various applications, among which a distinction is made here between therapeutic applications and non-therapeutic applications.

Thus, the invention relates firstly to an HPβCD in accordance with the invention for its use as a medicament.

Preferably, this use is for the treatment or prevention of a condition or disease associated with overload, and/or with storage and/or with accumulation of cholesterol in the tissues, as well as the consequences thereof. This includes, for example, cardiovascular diseases, vascular diseases, occlusive peripheral arterial diseases such as atherosclerosis or complications relating to an atheroma, diseases of the central nervous system, such as Alzheimer's disease, Parkinson's disease, focal segmental glomerulosclerosis, and lysosomal diseases affecting the central nervous system such as, for example, Niemann Pick disease, such as Niemann Pick disease type A, Niemann Pick disease type B, or Niemann Pick disease type C. The complications relating to an atheroma which are treated and/or prevented by the use of an HPβCD according to the invention are, in a nonlimiting manner, ischemia, for example myocardial ischemia, coronary diseases, angina pectoris, acute coronary syndrome, myocardial infarction, mesenteric infarction, stroke, aneurysm or arteriopathy of the lower limbs.

The HPβCDs of the invention are for use in the treatment of Niemann-Pick disease type C or in the treatment of focal segmental glomerulosclerosis.

Preferably, the HPβCDs of the invention are intended to be administered to humans or to animals, preferably to humans.

The HPβCDs of the invention are capable of being administered orally, parenterally, cutaneously or mucosally. The parenteral route comprises for example subcutaneous, intravenous, intramuscular or intraperitoneal administration, although the latter is rather reserved for animals. The mucosal route comprises for example nasal administration, pulmonary administration or administration via the rectal mucosa. The cutaneous route comprises for example the dermal route, especially via a transdermal device, typically a patch. For the treatment and/or prevention of diseases of the central nervous system, the intrathecal route or the spinal route might also be employed.

The present invention also relates to the use of an HPβCD according to the present invention for the manufacture of a medicament, especially intended for treating and/or preventing the abovementioned conditions and diseases. It also relates to a method for treating and/or preventing the abovementioned conditions and diseases in a subject, comprising the administration of a therapeutically effective amount of a HPβCD according to the invention.

The HPβCD in accordance with the invention also has other possible applications, in particular chosen from those usually found for products of this type.

Thus, the invention also relates to the use of an HPβCD according to the invention as an excipient, and/or to encapsulate a substance, and/or solubilize a substance in an aqueous medium, and/or to improve the chemical stability of a substance, and/or to improve the delivery of a substance to and through biological membranes, and/or to increase the physical stability of a substance, and/or to formulate a substance from a liquid form to a powder form, and/or to prevent interactions of one substance with another substance, and/or to reduce local irritation after topical or oral administration of a substance, and/or to prevent the absorption of a substance in certain tissues such as the skin, and/or to obtain a sustained release of a substance, and/or to mask the taste of a substance, in particular its bitterness, and/or to mask the odor of a substance, and/or to modify the bioavailability of a substance.

Preferably, these substances are lipophilic compounds or compounds bearing at least one lipophilic group.

These lipophilic compounds or compounds bearing at least one lipophilic group can for example be chosen from compounds which are sparingly soluble, very sparingly soluble, even practically insoluble in water, at room temperature (15-25° C.). "Sparingly water-soluble compound" is conventionally intended to mean that a volume of water from 100 to 1000 ml is required to dissolve 1 gram of said compound. For a "very sparingly water-soluble compound", this volume of water is more than 1000 ml and ranges up to 10 000 ml. For a "practically water-insoluble compound", this volume of water is more than 10 000 ml. In this regard, see [FIGS. 1, 2, 3] and in particular the definition given in the European Pharmacopeia with the reference "1.4 Monographs, 07/2014: 10 000".

The substance referred to here may conventionally be an active agent or an undesirable substance depending on the chosen use. For example, the HPβCDs of the invention can be used to mask bad odors, for example in the form of a deodorizing aerosol. They can also be used to prolong the effect of a flavor in a food composition, or else to dissolve and/or stabilize an active agent.

"Active agent" is usually understood to mean any substance for example of pharmaceutical, veterinary, food, nutraceutical, cosmetic or agro-chemical interest. Examples of such active agents are active pharmaceutical ingredients, colorants, flavors. Preferably, the active agents of the invention are active pharmaceutical ingredients, preferably intended for humans.

The active agents useful to the invention, in particular the active pharmaceutical ingredients, can be chemical molecules, but also "biological" active agents, as is the case for example for active principles based on or derived from proteins; nucleic acids, such as those derived from DNA or RNA; cells; or viruses. Examples of preferred active agents according to the invention are therapeutically active proteins, for example antibodies or hormones.

A subject of the present invention is also a composition comprising an HPβCD according to the invention and at least one other substance.

Preferably, said other substance is as defined above in the section concerning the use of the HPβCDs according to the invention. It is for example an active agent, preferably an active pharmaceutical ingredient, and/or a lipophilic compound or a compound bearing at least one lipophilic group and/or a compound which is sparingly soluble, very sparingly soluble, even practically insoluble in water, at room temperature (15-25° C.).

These other substances can also be chosen from commonly used compounds, depending on the use and/or the desired galenic form, as long as the latter do not go against the properties desired in the present invention. These other substances can for example be chosen from binders, (super) disintegrants and lubricants.

The HPβCDs and compositions comprising them according to the invention can be in any galenic form that a person skilled in the art deems suitable, in particular according to the intended use. They may for example be in liquid, solid or semi-solid form. They may for example be solutions, in particular injectable solutions, suspensions, dispersions, emulsions, pellets, granules, films, powders, gels, creams, ointments, pastes, sticks, tablets, hard capsules, soft capsules, osmotic devices, patches.

It is recalled in the present invention that when mention is made of a concentration of a substance in solution expressed as a percentage, and unless otherwise indicated, the latter conventionally corresponds to the amount in grams of dry substance per 100 ml of solution.

It is also recalled that when reference is made to a dry mass of substance ("dry weight"), it is indeed a mass of anhydrous substance. In other words, this mass excludes any water present in the starting substance in pulverulent form.

The invention will be understood more clearly with the aid of the following examples which are intended to be illustrative and nonlimiting.

Examples

A. Methods Used to Characterize HPβCDs

1. The moisture content (loss of mass on drying) was determined in accordance with the method of USP 41 NF 36 reproduced in the appendix ("Hydroxypropyl betadex monograph; loss on drying").
2. The reducing sugar content was determined by the Bertrand method, by precipitation with cuprous oxide in a reducing medium, filtration on sintered glass and weighing of the residue.
3. The pH in solution was determined by measuring the potential difference between two immersed electrodes, at 20-25° C. The HPβCD solution consisted of 2 g (dry) of HPβCD, 98 g of distilled water having a resistivity of greater than 500 000 ohms·cm, and 0.3 ml of a 225 g/L solution of potassium chloride.
4. The chloride (Cl—) content was determined by potentiometric titration of a solution of HPβCD, using a solution of silver nitrate of known concentration.
5. The maximum absorbance from 230 to 400 nm was determined on the basis of a distilled water solution containing 2.50 g (dry) of HPβCD per 100 ml of solution, using a cell having an optical path length of 10 mm
6. The contents of related substances in the HPβCD (β-CD, propylene glycol, other related impurities (including dipropylene glycol)) were determined according to a method in accordance with USP 41 NF 36 ("Hydroxypropyl betadex monograph; limit of betadex, propylene glycol, and other related substances").
7. The conductivity was determined at 25° C. according to a procedure in accordance with the method described in USP 41 NF 36 reproduced in the appendix ("Hydroxypropyl betadex monograph; conductivity"), on the basis of a 100 ml solution containing 10% of HPβCD prepared in distilled water having a resistivity greater than 500 000 ohms·cm. The resistivity R of the solution thus obtained was measured by an electronic conductivity meter, and the conductivity calculated from the latter (1/R).
8. The average degree of molar substitution (MS) was determined by NMR, in accordance with the method of USP 41 NF 36 reproduced in the appendix ("Hydroxypropyl betadex monograph; Molar substitution").
9. The substitution profile was determined by electrospray ionization-mass spectrometry (ESI-MS). A 1 g (dry)/L HPβCD solution was prepared in a methanol/water mixture (50/50, v/v) with 1 mM of sodium acetate. Infusion of each sample was carried out for 1 min at 10 μl/min and the MS data was recorded as described below. Between two successive injections, 500 μl of a methanol/water mixture (50/50, v/v) were injected to wash the ion source. The electrospray ionization (ESI) parameters were as follows: spray voltage: 5 kV; nebulizer gas: 9, auxiliary gas: 2; sweep gas: 0; capillary voltage: 23 V; capillary temperature: 275° C.; tube lens: 80 V. The mass spectrometry parameters were as follows: full scan; scanning ranges: 50-200 m/z; mass range: normal, scan rate: improved; acquisition time: 1 min. For each substituted HPβCD molecule (called HPX, X being the number of substitutions, per β-CD molecule), the ion current extracted for each ion (XIC) was integrated and compared to the sum of all the HPX ion currents, for which the intensities of the corresponding peaks were greater than the intensities of the background noise. As the sodium adduct was the most intense HPβCD ion, the area under the curve of the corresponding peak for each HPX was integrated and related to the sum of the areas of the HPX ions taken into account for the characterization (intensity greater than that of the background noise), in order to express it as a percentage.

10. The contents of organic solvents were determined by gas chromatography with detection by mass spectrometry (GC/MS). More precisely, the analyses were carried out by Headspace-GC/MS. The operating conditions were as follows: Bruker GC/MS equipped with a Vf-wax column of 30 m*0.25 mm, df 0.25 μm; Temperature program: 5 min at 40° C., 5° C./min up to 230° C.; injector 250° C. split 1:10; MS detector in EI+. The sample was prepared as follows: 0.2 g of dry HPβCD were dissolved in 1 ml of ultra-pure water.

11. The substitution patterns were determined according to a "HAKOMORI" method discussed above.

B. Prior Art: Values of MS and β-CD Contents of Commercial HPβCDs

In this section, values of MS and β-CD contents were measured for various commercial HPβCDs (Meas.). Supplier specifications were also provided by way of information (Spec.) when they were available.

TABLE 1

| | MS Spec. -> Meas. | β-CD Spec. -> Meas. |
|---|---|---|
| KLEPTOSE ® HP (ROQUETTE) | 0.81-0.99 -> 0.88 | ≤1.0% -> 0.1% |
| KLEPTOSE ® HPB (ROQUETTE) | 0.58-0.68 -> 0.63 | ≤1.0% -> 0.6% |
| CAVASOL ® W7 HP Pharma (WACKER) | 0.59-0.73 -> 0.64 | ≤1.0% -> 0.5% |
| CAVITRON ® W7 HP5 Pharma (WACKER) | 0.59-0.73 -> 0.65 | ≤1.5% -> 0.5% |
| CAVITRON ® W7 HP7 Pharma (WACKER) | 0.86-1.14 -> 1.02 | ≤1.5% -> 0.1% |
| TRAPPSOL ® Cyclo | Unknown -> 0.91 | Unknown -> ND |
| CELLDEX ® HPB-EC Pharma grade | Unknown -> 0.62 | Unknown -> 0.7% |
| C*CAVITRON ® 82005 (CARGILL) | Unknown -> 0.66 | Unknown -> 0.4% |
| COMPLEXOL-HP-GANGWAL CHEMICALS) | Unknown -> 0.74 | Unknown -> 0.3% |

These results confirm that the commercially available HPβCDs do not reconcile low MS with low residual β-CD contents. Thus, for example, the KLEPTOSE® HP, CAVASOL® W7 HP7 and COMPLEXOL-HP products, which have β-CD contents of less than or equal to 0.3%, nevertheless have an MS which systematically exceeds 0.71. Conversely, the KLEPTOSE® HPB, CAVASOL® W7 HP, CAVASOL® W7 HP5 and C*CAVITRON® products have an MS of less than 0.71, but their residual β-CD contents systematically exceed 0.3%.

C. Preparation and Characterization (MS and βCD) of HPβCD in Accordance or not in Accordance with the Invention 1. Method 1—with Purification by Decoloration, Filtrations and Membrane Purification The objective of this section is to present the influence of the hydroxypropylation parameters on the characteristics of the HPβCDs obtained.

An HPβCD according to the invention (IN-1) was prepared as follows: 1313 g of commercial β-cyclodextrin (β-CD) (corresponding to 1188 g of anhydrous β-CD) were dissolved in an alkaline medium, with stirring and in an autoclave under an inert atmosphere. A solution comprising 52% of β-CD by dry weight relative to the total weight of solution, and 2.9% of sodium hydroxide relative to the dry weight of βCD ([NaOH] in the table below) was thus obtained. The reaction medium was maintained for 30 minutes at a temperature [T] of 95° C., then 361.6 g of propylene oxide were added at a rate [D] of 0.22 kg/h/kg of dry β-CD, i.e. in a propylene oxide/anhydroglucose [PO/G] molar ratio of 0.85/1.00. After the end of the introduction of the propylene oxide, the reaction medium was kept stirring for 4 hours and then neutralized with hydrochloric acid.

The HPβCD was then purified and dried by the following techniques, in an aqueous medium, that is to say without using organic solvents:

Decoloration;
Filtrations;
Membrane purification;
Evaporative drying.

The activated carbon decoloration step was carried out in batch mode, with stirring for a minimum of 1 hour at 70° C.±5° C. The medium was then filtered through a cricket filter and then through a 0.22 μm cartridge filter. The membrane purification step was in particular carried out using a nanofiltration module equipped with a membrane having a cutoff threshold of 800 Da, at a pressure below 35 bar and at a temperature above 45° C. The propylene glycol content of the retentate was monitored by HPLC assay. The operation was stopped as soon as a propylene glycol content of less than 0.5% by weight relative to dry product was reached. The HPβCD thus obtained was then dried under reduced pressure in a rotary evaporator so as to have a solids content by weight of greater than 95%.

A comparative HPβCD (CP-1) was prepared as follows: 656 g of commercial β-cyclodextrin (β-CD) (corresponding to 594.4 g of anhydrous β-CD) were dissolved in an alkaline medium, with stirring and in an autoclave under an inert atmosphere. A solution comprising 52% of β-CD by dry weight relative to the total weight of solution, and 2.9% of sodium hydroxide relative to the dry weight of βCD was thus obtained. The reaction medium was maintained for 30 minutes at a temperature [T] of 75° C., then 182.6 g of propylene oxide were added at a flow rate [D] of 0.14 kg/h/kg of dry β-CD, i.e. in a propylene oxide/anhydroglucose [PO/G] molar ratio of 0.86/1.00. After the end of the introduction of the propylene oxide, the reaction medium was kept stirring for 4 hours and then neutralized with hydrochloric acid. The HPβCD thus obtained was purified and dried in the same way as HPβCD IN-1.

The HPβCDs obtained were characterized with regard to their MS and their β-CD content. The hydroxypropylation conditions and also the values of MS and β-CD content are presented in the following table:

TABLE 2

| Test | Hydroxypropylation conditions | | | | Characteristics of the HPβCDs obtained | |
|---|---|---|---|---|---|---|
| ref. | [T] | [D] | [PO/G] | [NaOH] | MS | β-CD |
| IN-1 | 95° C. | 0.22 kg/h/kg β-CD | 0.85/1.00 | 2.9% | 0.68 | 0.26% |
| CP-1 | 75° C. | 0.14 kg/h/kg β-CD | 0.86/1.00 | 2.9% | 0.72 | 0.24% |

Other tests were then carried out as follows:

For each test, the use of anhydrous β-CD is approximately 250 g and the amounts of water and of propylene oxide introduced correspond proportionately to those used for the preparation of HPβCD IN-1. In particular, this means that the [PO/G] molar ratio was equal to 0.85/1.00. The temperature [T] of the reaction medium before introduction of the propylene oxide was 110° C. Various amounts of sodium hydroxide [NaOH] were tested, which are expressed as dry percentages of sodium hydroxide relative to the dry weight of β-CD in the table below. Propylene oxide was added at a rate [D]. After reacting, the reaction medium was neutralized with hydrochloric acid. For each sodium hydroxide [NaOH] content tested, two crude reaction products were produced, which were then combined in order to have enough material for the nanofiltration step of the purification. The HPβCD crude reaction products thus obtained were therefore purified and dried in the same way as HPβCD IN-1.

The HPβCDs obtained were characterized with regard to their MS and their β-CD content. The hydroxypropylation conditions and also the values of MS and β-CD content are presented in the following table:

TABLE 3

| | Hydroxypropylation conditions | | | | Characteristics of the HPβCDs obtained | |
|---|---|---|---|---|---|---|
| Test ref. | [T] | [D]* | [NaOH] | [PO/G] | MS | β-CD |
| IN-1.5% NaOH | 110° C. | 0.19 kg/h/kg β-CD<br>0.19 kg/h/kg β-CD | 1.5% | 0.85/1.00 | 0.66 | 0.25 |
| IN-2.9% NaOH | 110° C. | 0.17 kg/h/kg β-CD<br>0.20 kg/h/kg β-CD | 2.9% | 0.85/1.00 | 0.65 | 0.31 |
| CP-3.7% NaOH | 110° C. | 0.16 kg/h/kg β-CD<br>0.15 kg/h/kg β-CD | 3.7% | 0.85/1.00 | 0.65 | 0.38 |
| CP-6.0% NaOH | 110° C. | 0.13 kg/h/kg β-CD<br>0.14 kg/h/kg β-CD | 6.0% | 0.85/1.00 | 0.62 | 0.63 |
| CP-9.0% NaOH | 110° C. | 0.09 kg/h/kg β-CD<br>0.10 kg/h/kg β-CD | 9.0% | 0.85/1.00 | 0.58 | 1.03 |

*the two values correspond to the two crude reaction products produced.

All of these tests show that when the hydroxypropylation conditions are judiciously configured, it is possible to obtain an HPβCD having the MS and the β-CD contents targeted by the present invention.

Very advantageously for the purification, it is not necessary to involve organic solvents. Thus, the HPβCD according to the invention can be free of organic substances other than those which conventionally result from the hydroxypropylation step and from the raw materials used for this hydroxypropylation.

2. Process 2—with Decoloration and Additional Filtrations

The objective of this section is to present an optimized process for the preparation of an HPβCD of the invention.

An HPβCD according to the invention (IN-2) was prepared as follows: 1305 g of commercial β-cyclodextrin (β-CD) (corresponding to 1204 g of anhydrous β-CD) were dissolved in an alkaline medium, with stirring and in an autoclave under an inert atmosphere. A solution comprising 52% of β-CD by dry weight relative to the total weight of solution, and 2.9% of sodium hydroxide relative to the dry weight of βCD was thus obtained. The reaction medium was maintained for 30 minutes at a temperature [T] of 95° C., then 367 g of propylene oxide were added at a rate [D] of 0.22 kg/h/kg of dry β-CD, i.e. in a propylene oxide/anhydroglucose [PO/G] molar ratio of 0.85/1.00. After the end of the introduction of the propylene oxide, the reaction medium was kept stirring for 4 hours and then neutralized with hydrochloric acid.

The HPβCD obtained was then purified and dried by undergoing the following steps, in an aqueous medium, that is to say without using organic solvents:

Decoloration;

Filtrations;

Membrane purification;

Demineralization;

Decoloration;

Filtrations;

Spray-drying.

The decoloration step was carried out by activated carbon treatment for 1 hour at 70° C. The medium was then filtered through a bag filter then a 1 μm and then 0.22 μm cartridge filter. The membrane purification step was carried out using a nanofiltration module equipped with a membrane having a cutoff threshold of less than 800 Da, at a pressure below 35 bar and at a temperature above 45° C. The propanediol glycol content of the retentate was monitored by HPLC assay. The nanofiltration operation was stopped as soon as a propanediol content of less than 0.1% by weight relative to dry product was reached. The demineralization step was carried out in particular by passing through a cationic and then anionic ion-exchange column, and finally through a mixed bed in order to obtain an outlet resistivity greater than 500 000 Ω·cm. The second decoloration step was carried out in batch mode by activated carbon treatment with stirring at 70° C. for at least 1 h. The HPβCD solution was then filtered through a bag filter then a 1 μm and then 0.22 μm cartridge filter. The HPβCD was then obtained in pulverulent form by spray drying the HPβCD solution.

A thorough characterization of the HPβCD of the invention IN-2 was then carried out. The results are presented in the following table:

TABLE 4

| | IN-2 |
|---|---|
| MS | 0.69 |
| β-CD content | 0.24% |
| Propylene glycol content | <0.05% |
| Impurities related to HPBCD other than β-CD and propylene glycol | <0.1% including 0.01% of dipropylene glycol |
| Moisture content | 3.8% |

TABLE 4-continued

| | IN-2 |
|---|---|
| Content of reducing sugars | <0.1% |
| pH at 2% | 5.7 |
| Content of chloride ions ($Cl^-$) | <50 ppm |
| Maximum absorbance | 0.01 |
| Conductivity | 3 μS/cm |

TABLE 4-continued

| | IN-2 |
|---|---|
| Substitution profile | |
| HP0 | 0.0% |
| HP1 | 0.4% |
| HP2 | 1.6% |
| HP3 | 4.9% |
| HP4 | 11.5% |
| HP5 | 20.6% |
| HP6 | 25.9% |
| HP7 | 20.7% |
| HP8 | 10.2% |
| HP9 | 3.3% |
| HP10 | 0.7% |
| HP ≥ 11 | HP11 = 0.1%<br>HP12 = 0.0%<br>HP13 = 0.0%<br>HP14 = 0.0% |

Observation: a value preceded by the "<" sign indicates that the measured value was below the detection threshold.

D. Substitution Patterns of HPβCDs in Accordance or not in Accordance with the Invention In this section, the inventors have determined the substitution patterns of HPβCDs in accordance with the invention, of comparative HPβCDs, and also of commercial HPβCDs. For HPBCD IN-2, several batches were tested.

The results, expressed as percentages, are presented in tables 5 and 6. The MS and residual β-CD values have also been reported.

"mono": proportion of substitutions corresponding to mono-substitutions (2 OHP, 3 OHP, 6 OHP); "di": proportion of substitutions corresponding to di-substitutions (2,3-di-OHP, 2,6-di-OHP, 3,3'-di-OHP);

"tri": proportion of substitutions corresponding to tri-substitutions (2,3,6-tri-OHP);

"C2/C6": ratio of C2/C6 substitutions ((2 OHP+2,3-di-OHP+2,6-di-OHP+2,3,6-tri-OHP)/(6 OHP+2,6-di-OHP+2,3,6-tri-OHP));

"C2/C3": ratio of C2/C3 substitutions ((2 OHP+2,3-di-OHP+2,6-di-OHP+2,3,6-tri-OHP)/(3 OHP+2,3-di-OHP+3,3'-di-OHP+2,3,6-tri-OHP).

TABLE 5

| | No OHP | 2 OHP | 3 OHP | 6 OHP | 2,3-di-OHP | 2,6-di-OHP | 3,3'-di-OHP | 2,3,6-tri-OHP |
|---|---|---|---|---|---|---|---|---|
| IN-2 #batch 1 | 42.7 | 30.4 | 8.0 | 4.0 | 10.0 | 3.1 | 0.8 | 1.1 |
| IN-2 #batch 2 | 43.5 | 29.7 | 7.9 | 3.9 | 9.7 | 3.4 | 0.7 | 1.1 |
| IN-2 #batch 3 | 46.2 | 29.8 | 7.3 | 3.6 | 9.2 | 2.5 | 0.6 | 0.8 |
| IN-2 #batch 4 | 46.9 | 30.1 | 7.1 | 2.6 | 9.4 | 2.6 | 0.5 | 0.9 |
| IN-2 #batch 5 | 47.0 | 28.7 | 7.0 | 3.2 | 9.4 | 3.2 | 0.6 | 1.0 |
| IN-1, 5% NaOH | 44.3 | 29.1 | 8.3 | 3.4 | 10.5 | 2.8 | 0.7 | 0.9 |
| IN-2.9% NaOH | 46.3 | 28.6 | 7.4 | 3.8 | 9.9 | 2.2 | 0.8 | 1.0 |
| CP-3.7% NaOH | 46.1 | 28.0 | 7.8 | 4.1 | 9.5 | 2.7 | 0.8 | 1.1 |
| CP-6.0% NaOH | 47.5 | 26.8 | 7.2 | 5.4 | 8.5 | 3.1 | 0.8 | 0.8 |
| CP-9.0% NaOH | 50.9 | 23.8 | 6.7 | 6.1 | 7.1 | 3.5 | 0.9 | 1.1 |
| CAVASOL ® W7 HP Pharma (WACKER) | 47.6 | 26.9 | 7.7 | 2.4 | 11.8 | 2.2 | 0.6 | 0.8 |
| CAVITRON ® W7 HP5 Pharma (WACKER) | 46.5 | 27.7 | 7.7 | 2.4 | 12.0 | 2.3 | 0.6 | 0.8 |
| CAVITRON ® W7 HP7 Pharma (WACKER) | 26.0 | 30.9 | 6.9 | 3.1 | 23.1 | 5.1 | 1.2 | 3.7 |

TABLE 6

| | mono | di | tri | C2/C6 | C2/C3 | MS | β-CD |
|---|---|---|---|---|---|---|---|
| IN-2 #batch 1 | 74% | 24% | 2% | 5.5 | 2.2 | 0.69 | 0.24% |
| IN-2 #batch 2 | 74% | 25% | 2% | 5.2 | 2.3 | 0.69 | 0.24% |
| IN-2 #batch 3 | 76% | 23% | 2% | 6.1 | 2.4 | 0.69 | 0.1% |
| IN-2 #batch 4 | 75% | 23% | 2% | 7.1 | 2.4 | 0.69 | 0.1% |
| IN-2 #batch 5 | 73% | 25% | 2% | 5.8 | 2.3 | 0.69 | 0.1% |
| IN-1, 5% NaOH | 73% | 25% | 2% | 6.1 | 2.1 | 0.66 | 0.25% |
| IN-2.9% NaOH | 74% | 24% | 2% | 5.9 | 2.2 | 0.65 | 0.31% |
| CP-3.7% NaOH | 74% | 24% | 2% | 5.2 | 2.2 | 0.65 | 0.38% |
| CP-6.0% NaOH | 75% | 24% | 1% | 4.2 | 2.3 | 0.62 | 0.63% |
| CP-9.0% NaOH | 75% | 23% | 2% | 3.3 | 2.3 | 0.58 | 1.03% |
| CAVASOL ® W7 HP Pharma (WACKER) | 71% | 28% | 2% | 7.7 | 2.0 | 0.64 | 0.5% |
| CAVITRON ® W7 HP5 Pharma (WACKER) | 71% | 28% | 2% | 7.8 | 2.0 | 0.65 | 0.5% |
| CAVITRON ® W7 HP7 Pharma (WACKER) | 55% | 40% | 5% | 5.3 | 1.8 | 1.02 | 0.1% |

Observation: on all the HPBCDs tested, no signal corresponding to other types of substitution (for example of the 3,6-di-OHP type) was obtained. There were therefore no detectable amounts of anhydroglucose units having other types of substitutions than those presented in tables 5 and 6.

These results show that the HPβCDs in accordance with the invention have particular substitution patterns, in particular compared to the CAVASOL® W7 HP Pharma, CAVITRON® W7 HP5 Pharma and CAVITRON® W7 HP7 Pharma products, also analyzed.

According to experiments carried out by the inventors (data not presented here), substitution patterns such as those of the HPβCD of the invention seem to confer particular properties, in particular better efficiency in the stabilization of substances, in particular of active pharmaceutical ingredients, and more specifically of biological active agents such as pharmaceutically active proteins. In particular, for the stabilization of therapeutic proteins, a greater decrease in protein aggregation was obtained with an HPβCD which had substitution patterns such as those of the HPβCD of the invention, compared to that obtained with the CAVASOL® W7 HP Pharma, CAVITRON® W7 HP5 Pharma and CAVITRON® W7 HP7 Pharma products.

The invention claimed is:

1. A hydroxypropyl-beta-cyclodextrin (HPβCD), characterized in that:

- it has an average degree of molar substitution (MS) of less than or equal to 0.71;
- it has a β-cyclodextrin (β-CD) content of less than or equal to 0.3% by dry weight as determined by HPLC according to a procedure in accordance with the method of USP 41 NF 36;
- it is free of residual solvents as defined in section <467> of USP 41 NF 36, and
- the substitution pattern of HPβCD is such that:
  - the proportion of substitutions corresponding to mono-substitutions is at least equal to 60% and at most equal to 80%;
  - the proportion of substitutions corresponding to di-substitutions is at least equal to 15% and at most equal to 40%,
  - the proportion of substitutions corresponding to tri-substitutions is at least equal to 1%, and at most equal to 5%;
  - the C2/C6 substitutions ratio is at least equal to 2.0 and at most equal to: 10.0; and
  - the C2/C3 substitutions ratio is at least equal to 1.5 and at most equal to: 3.0.

2. The HPβCD as claimed in claim 1, characterized in that the MS is chosen within the range of from 0.50 to 0.71.

3. The HPβCD as claimed in claim 2, characterized in that the MS is chosen within the range of from 0.58 to 0.71.

4. The HPβCD as claimed in claim 1, characterized in that its β-CD content is less than or equal to 0.2% by dry weight.

5. A process for preparing the HPβCD of claim 1, characterized in that the process comprises:

- a step (a) of preparing an aqueous solution comprising beta-cyclodextrin (β-CD) and sodium hydroxide, the amount of sodium hydroxide used being less than 3.7% by dry weight of sodium hydroxide, relative to the dry weight of β-CD;
- a step (b) of adding propylene oxide to the solution obtained in step (a), characterized in that:
  - the temperature of the solution obtained in step (a), before introduction of the propylene oxide, is chosen within the range of from 80° C. to 120° C.;
  - the propylene oxide/anhydroglucose molar ratio used is chosen within the range of from 0.70/1.00 to 0.86/1.00;
  - the rate of addition of propylene oxide is chosen within the range of from 0.15 to 0.30 kg/h/kg of β-CD;
- a purification step (c), characterized in that it does not use organic solvents; and
- a step (d) of recovering the HPβCD thus obtained.

6. A method of using an HPβCD as claimed in claim 1, or an HPβCD obtained by the process of claim 5, the method comprising:

- (a) encapsulating a substance with the HPβCD, or
- (b) solubilizing a substance in an aqueous medium with the HPβCD, or
- (c) combining the HPβCD with a substance, thereby improving the chemical stability of the substance, and/or improving the delivery of the substance to and through biological membranes, and/or increasing the physical stability of the substance, and/or preventing interactions of the substance with a second substance, or
- (d) formulating a substance from a liquid form to a powder form, or
- (e) administering topically or orally a composition comprising the HPβCD and a substance to a subject, wherein the HPβCD reduces local irritation after topical or oral administration of the substance, and/or prevents the absorption of the substance in a particular tissue optionally wherein the tissue is skin, and/or thereby providing a sustained release of the substance, and/or thereby masking the taste of the substance, optionally wherein the taste is bitterness, and/or thereby masking the odor of the substance, and/or thereby modifying the bioavailability of the substance.

7. A composition comprising an HPβCD as claimed in claim 1, or obtainable by the process of claim 6, and at least one other substance.

8. The composition as claimed in claim 7, wherein said at least one other substance is an active agent.

9. The composition as claimed in claim 8, characterized in that said active agent is an active pharmaceutical ingredient.

10. The HPβCD as claimed in claim 1, characterized in that it is obtained by a process excluding the use of organic solvents.

* * * * *